(12) United States Patent
Mahieu et al.

(10) Patent No.: US 10,470,366 B2
(45) Date of Patent: Nov. 12, 2019

(54) RESIDUE SPREADING SYSTEM

(71) Applicant: CNH Industrial America LLC, New Holland, PA (US)

(72) Inventors: Thomas Mahieu, Ypres (BE); Bart M. A. Missotten, Herent (BE); Karel M. C. Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 172 days.

(21) Appl. No.: 15/312,520

(22) PCT Filed: May 20, 2015

(86) PCT No.: PCT/EP2015/061074
§ 371 (c)(1),
(2) Date: Nov. 18, 2016

(87) PCT Pub. No.: WO2015/177190
PCT Pub. Date: Nov. 26, 2015

(65) Prior Publication Data
US 2017/0086373 A1 Mar. 30, 2017

(30) Foreign Application Priority Data
May 21, 2014 (BE) .................................. 2014/0391

(51) Int. Cl.
*A01D 41/127* (2006.01)
*G01S 13/88* (2006.01)
(Continued)

(52) U.S. Cl.
CPC ....... *A01D 41/127* (2013.01); *A01D 41/1243* (2013.01); *G01S 13/88* (2013.01); *G01S 15/88* (2013.01)

(58) Field of Classification Search
CPC .............. A01D 41/127; A01D 41/1243; A01D 41/1271; A01D 41/1272; A01D 41/1278; G10S 15/88; G10S 13/88
See application file for complete search history.

(56) References Cited

U.S. PATENT DOCUMENTS 4,507,910 A * 4/1985 Thornley ............. A01D 41/141
56/10.2 E
5,569,081 A   10/1996 Baumgarten et al.
(Continued)

FOREIGN PATENT DOCUMENTS

EP  0300580 A2    1/1989
EP  0685151 A1 * 12/1995 ......... A01D 41/1243
(Continued)

*Primary Examiner* — Thomas B Will
*Assistant Examiner* — Joan D Misa
(74) *Attorney, Agent, or Firm* — Peter K. Zacharias; Patrick M. Sheldrake

(57) ABSTRACT

An agricultural combine including a residue spreading system that is steerable to influence distribution of the residue spreading system. The combine is provided with a sensor provided for emitting a wave signal through the residue when the combine is spreading the residue. The sensor is configured to measure reflections of the signal from a first zone of the residue and from a second zone of the residue. The spreading system is steered based on the reflections. The wave signal has a wavelength that is larger than 0.001 mm and that is smaller than 50 mm.

12 Claims, 3 Drawing Sheets

(51) Int. Cl.
G01S 15/88 (2006.01)
A01D 41/12 (2006.01)

(56) References Cited

U.S. PATENT DOCUMENTS

| | | | |
|---|---|---|---|
| 7,086,942 B2 | 8/2006 | Niermann et al. | |
| 7,306,174 B2 | 12/2007 | Pearson et al. | |
| 7,467,997 B2 | 12/2008 | Niermann et al. | |
| 8,915,144 B2 | 12/2014 | Hien | |
| 9,066,470 B2* | 6/2015 | Ricketts | A01D 41/1243 |
| 9,220,195 B2* | 12/2015 | Eggenhaus | A01D 41/127 |
| 9,699,967 B2* | 7/2017 | Palla | A01D 41/1243 |
| 9,974,232 B2* | 5/2018 | Shane | A01D 41/1243 |
| 2011/0270495 A1* | 11/2011 | Knapp | A01B 79/005 |
| | | | 701/50 |
| 2015/0016225 A1 | 1/2015 | Steckel et al. | |
| 2015/0264864 A1* | 9/2015 | Branch | A01D 41/1243 |
| | | | 701/50 |
| 2017/0142900 A1* | 5/2017 | Mahieu | A01D 41/1243 |
| 2018/0303030 A1* | 10/2018 | Heitmann | A01D 41/1243 |
| 2018/0310474 A1* | 11/2018 | Posselius | A01D 41/127 |

FOREIGN PATENT DOCUMENTS

| | | |
|---|---|---|
| EP | 1731983 A1 | 12/2006 |
| JP | H0823752 A | 1/1996 |

\* cited by examiner

RESIDUE SPREADING SYSTEM

CROSS REFERENCE TO RELATED APPLICATION

This application is the National Stage of International Application No. PCT/EP2015/06107 filed May 20, 2015, which claims priority to Belgian Application No. 2014/0391 filed May 21, 2014, the contents of which are incorporated herein by reference.

The present invention relates to an agricultural combine with a residue spreading system that is steerable to influence distribution of the residue spreading system. Particularly, the invention relates to a steering system for automatically adapting the distribution of the residue that is spread out by the residue spreading system of the agricultural combine.

Agricultural combines are used for harvesting a field. To this end, the agricultural combine, comprises at its front end, a header with cutting means for cutting the crop material on the field, and intake means for drawing the crop material into the agricultural combine. Inside the agricultural combine, the crop material is processed to separate the harvest from the residue. This process is also known as threshing and winnowing. The agricultural combine comprises an opening at its back end, so that the residue (obtained after the processing of the crop material in the combine) can be spread out on the field directly after processing. Thereby, it is advantageous to evenly distribute the residue over the field. In practice, the header of the agricultural combine, comprising the cutting means, has a large width (meaning it extends in the transverse direction over a significantly large distance) that is typically a number of times bigger than the width of the combine. As a result, when the residue is to be evenly distributed on the field over a width that corresponds to the width of the header, the residue is to be thrown out with significant force. The residue then flies through the air over a substantial distance thereby being distributed over the field. Such systems for distributing the residue are known in the art as residue spreading systems.

Residue spreading systems are steerable to adapt the distribution of the residue spreading. Thereby, the residue spreading system can be steered depending on the type of header that is attached to the combine, to the type of crop material that is processed, and to environmental conditions. This can be done manually (by the operator that is operating the combine) or automatically based on sensors. An example of such sensor that is known (from EP0685151) to be used to steering the residue spreading system is a wind sensor. Depending on the direction and the speed of the wind that is measured by the wind sensor, the residue spreading system is steered to adapt the residue spreading system accordingly, so that residue is evenly distributed whereby the influence of the wind on the residue is compensated. In practice, the residue will mainly be formed by straw particles.

Sensing the distribution of the residue has posed several problems. A first problem is that together with the residue spreading, a lot of dust is created. The dust obstructs the view on the residue so that the residue distribution cannot be visually checked when distributing. Other sensors have been proposed wherein the residue distribution is measured after the residue has fallen on the ground surface, for example in US2005/0194473. In practice, it appears to be very difficult to distinguish ground surface without residue from ground surface with residue. It furthermore appears to be difficult to measure the thickness of the residue on the ground surface using a sensor that is located somewhere on the combine.

It is an object of the present invention to provide a steering system for a residue spreading system of an agricultural combine that is accurate and reliable.

To this end, the agricultural combine of the invention comprises a residue spreading system that is steerable to influence distribution of the residue spreading system, wherein the combine comprises a sensor provided for emitting a wave signal in the direction of the residue when the combine is spreading the residue, and wherein the sensor is provided for measuring reflections of the signal from a first zone of the residue and from a second zone of the residue, and wherein the spreading system is steerable based on the reflections, wherein the wave signal has a wavelength that is larger than 0.001 mm and that is smaller than 50 mm.

The agricultural combine of the invention is provided with a sensor with specific technical features so that it is able to measure the amount of residue that is spread out of the combine (thus when the residue is flying through the air). The sensor emits a wave signal with a wavelength that is larger than 0.001 mm and that is smaller than 50 mm. Because the wave signal has a wavelength that is larger than 0.001 mm, the wave signal will not (at least not noteworthy) be reflected by dust particles since dust particles have an average diameter that is smaller than the 0.001 mm. Furthermore, residue particles, particularly when considered in the length direction, have dimensions that are generally larger than 50 mm. Therefore, since the wave signal has a wave length smaller than 50 mm, the wave signal will reflect on the residue particles. Thereby, the sensor is provided for measuring reflections of the signal from a first zone of the residue and from a second zone of the residue. Because the signal is only reflected by the residue, and not by the dust (in which the residue is covered when it is spread out of the agricultural combine), the sensor is provided for measuring reflections of the residue in these zones. Based on these reflections, the amount of residue in each of the zones can be determined (since the amount is directly proportional to the reflection intensity), and thereby also distribution of the residue can be determined. At least the difference in amount of residue between the first zone and the second zone can be determined, so that based on these difference the residue spreading system can be steered to influence the distribution. Thereby, the invention provides in a sensor that allows to directly measure the residue that is spread out of the agricultural combine. This significantly improves steering of the residue spreading system, since the steering of the residue spreading system can be based on the residue distribution itself.

Preferably the wave signal has a wave length that is larger than 0.1 mm, more preferably larger than 1 mm. Tests have shown that using a wave signal with a wave length larger than 0.1 mm, preferably larger than 1 mm, the influence of dust on the reflection of the wave signal emitted by the sensor is minimized Since these reflections can be regarded as noise when it is an object to measure reflections of the residue, noise is minimized in the reflected signal.

Preferably the wave signal has a wave length that is smaller than 10 mm, more preferably smaller than 5 mm. Tests have shown that using a wave length smaller than 10 mm, preferably smaller than 5 mm, reflections of the wave signal emitted by the sensor on residue particles can be optimized.

Preferably the sensor is a radar sensor. Radar sensors are known for emitting a wave signal and measuring the reflections of the emitted wave signal. Therefore a radar sensor is suitable for being used in the invention.

According to another embodiment, the sensor is preferably a sonar sensor. Alternative to a radar sensor, a sonar sensor is also known for emitting a wave signal en measuring reflections of the emitted wave signal. Since residue is measured when it is spread out of the agricultural combine, reflection distances remain within a maximum of 10 m. In wave signal reflection measurements, 10 m is considered short. A sonar sensor is suitable for measuring reflections in such short distances. Therefore sonar sensors are suitable for being used as sensor in the present invention.

Preferably the reflections are measured by the sensor via a receiver and the sensor comprises at least two receivers each being adapted for receiving reflections from the respective first zone and second zone. By providing two receivers at the sensor, reflections coming from two directions can be easily separated and compared to gain information on the distribution. Thereby, each of the receivers is directed towards a respective zone so that reflections from this zone are received by the receiver.

Preferably the sensor comprises two emitters adapted for emitting the wave signal, respectively through the first zone and the second zone, wherein the two emitters correspond to the two receivers. Thereby, the sensor comprises two sensor elements each having an emitter and a receiver cooperating together to measure reflections from a zone. Via the two sensor element, the residue distribution can be determined.

Preferably the sensor comprises only a single emitter adapted for emitting the wave signal through the first zone and the second zone. In such configuration one sensor element is providing having a single emitter and typically having multiple receivers for receiving reflections from multiple zones. Thereby, the single emitter is provided for emitting the wave signal over a wide angle so that both the first zone and the second zone are covered by the emitted wave signal.

Preferably the sensor is positioned to emit the wave signal and measure reflections in a first and second predetermined direction, which directions correspond to the first and second zone. This means that starting from the sensor and going into the predetermined direction, the corresponding zone is crossed. This allows to measure reflections from a first zone by measuring reflections coming out of a predetermined direction.

Preferably the sensor is positioned such that the directions are substantially parallel to a ground surface, and wherein the reflections are directly proportional to an amount of residue in the respective zone. When the sensor is positioned to measure reflections of an emitted signal in a direction that is parallel to a ground surface, then the only reflections that can be reasonably expected (in a short distance), are reflections from the residue. Namely, reflections from a ground surface will not arrive at the receiver since the receiver measures parallel to the ground surface. Because the only reflections that are measured come from the residue, the reflections are directly proportional to an amount of residue in the respective zone.

Preferably the sensor is positioned towards a ground surface and wherein the reflections comprise two parts, a first part being directly proportional to an amount of residue in the respective zone and a second part corresponding to a reflection of the wave signal on the ground surface and being inversely proportional to the amount of residue in the respective zone. The skilled person will understand that the first part and the second part of the reflections are separated in time (as a result of the difference in distance towards objects reflecting the wave). When the sensor is directed to a ground surface, at least the sensor will receive a reflection of the emitted wave signal on the ground surface. This reflection is received after reflections of the residue (since the residue spread out by the agricultural combine is flying through a zone between the agricultural combine and the ground surface). Therefore, when a wave signal is emitted, the first reflections that are received correspond to reflections on the residue. The last (and often largest) reflection that is received by the receiver corresponds to the reflection of the emitted signal on the ground surface. The reflections on the residue are directly proportional to the amount of residue flying through the zone. Because the residue already reflects (and thereby distorts) a portion of the energy of the wave signal, the reflection on the ground surface has an intensity that is inversely proportional to the amount of residue in the zone. Namely, when a lot of residue is present in the zone, only a small part of the wave signal reaches the ground surface to reflect on the ground surface, and consequently a small reflection is received by the receiver. On the other hand, when no residue is flying through the zone, no distortion or reflection occurs in the zone, and the wave signal can reflect on the ground surface without a hindrance. Therefore, a so-measured reflection will have a higher intensity.

Preferably the combine further comprises processing means connected to the sensor to receive the measured reflections in the form of an input signal, which processing means is furthermore connected to the residue spreading system to steer the residue spreading system via an output signal. In this manner, a control system is provided for automatically steering the residue spreading system based on the reflections measured by the sensor.

The invention further relates to a straw sensor comprising an emitter provided for emitting a wave signal in the space comprising straw, the sensor further comprising a receiver for measuring reflections of the emitted wave signal, wherein the wave signal has a wavelength that is larger than 0.001 mm and that is smaller than 50 mm. Via the straw sensor of the invention, an amount of straw flying through the air can be measured. In practical situations, when straw flies through to the air, dust obstructs the view on the straw. However via the sensor of the invention, the amount of straw can be detected despite the dust.

The invention further relates to a method for steering a residue spreading system of an agricultural combine, wherein the method comprises:

emitting a wave signal having a wavelength that is larger than 0.001 mm and that is smaller than 50 mm through the residue when the combine is spreading the residue;

measuring reflections of the signal in at least a first direction and a second direction;

steering the residue spreading system based on the measured reflections to influence distribution of the residue spreading system.

The method of the invention provides in a use of the agricultural combine of the invention. The advantages and effects of the method of the invention correspond to the advantages and effects of the agricultural combine of the invention, and therefore the description above, relating to the advantages and the effects of the agricultural combine, equally applies to the method of the invention.

The invention will now be described in more details with respect to the drawings illustrating some preferred embodiments of the invention. In the drawings.

In the drawings a same reference number has been allocated to a same or analogous element.

Figure 1:
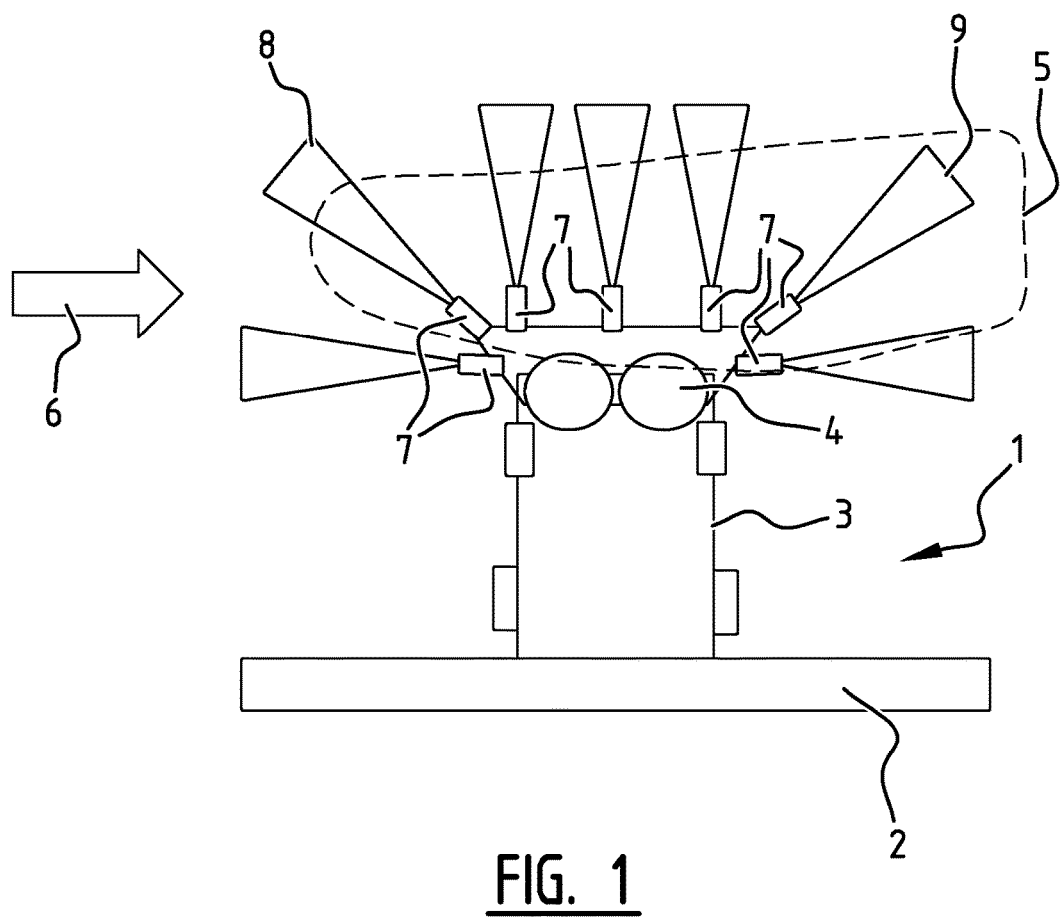
FIG. 1 shows a schematic top view of an agricultural combine according to an embodiment of the invention.

FIG. 1 shows a schematic top view of an agricultural combine 1. The combine 1 comprises a header 2, which is connected to the front end of a combine body 3. The back end of the combine body 3 comprises a residue spreading system 4. Thereby, when the combine 1 is harvesting a field, the header 2 cuts the crop material from the field, and draws the crop material into the body 3 of the combine 1. In the body 3, the crop material is processed to separate the harvest from the residue. The residue is then transported, inside the body 3 of the combine 1, to the residue spreading system 4, which throws the residue onto the field. Thereby, the residue spreading system 4 is preferably configured to approach an ideal situation, wherein the residue is evenly distributed on the field over a width that is equal to the width of the header 2. FIG. 1 shows an example of a situation wherein a side wind 6 influences the distribution 5 of the residue when the residue is spread out of the residue spreading system 4. This side wind 6 has a result that the distribution of the residue deviates significantly from the ideal situation.

The distribution of the residue on the field is adaptable by steering the residue spreading system 4. Indeed, residue spreading systems 4 according to the prior art can be steered to influence the residue distribution. Particularly, the force/speed with which the residue spreading system 4 throws the residue out of the back end of the agricultural combine 1 can be adjusted. Furthermore, the angular range over which the residue spreading system 4 spreads the residue can also be adjusted. Thereby, the residue spreading system 4 typically comprises multiple (at least a left and a right) of such adjustable mechanisms for throwing out the residue. This allows to steer the distribution of the residue spreading system 4. Since such mechanisms are known in the prior art, no further specifications are given regarding such residue spreading system since the skilled person knows these systems and will know how such systems can be steered to adapt the residue distribution.

The agricultural combine 1 is provided with a sensor. In the example of FIG. 1, the sensor is formed by multiple sensor elements 7. The sensor 7 has a wave signal emitter and a receiver. The wave signal emitter is provided to emit a wave signal while the receiver is provided for receiving reflections of the emitted wave signal. Details and examples of the sensor 7 are given hereunder in relation to FIG. 2. In each case, the sensor 7 is provided for measuring reflections of the emitted signal from a first zone 8 and from a second zone 9 of the residue. When the residue spreading system 4 throws out residue particles in an attempt to evenly distribute the residue on the field, a cloud of residue particles 5 is formed in an area directly behind the agricultural combine 1. This cloud of residue particles 5 covers a 3-dimensional space, the dimensions of which depend on the settings of the residue spreading system 4. The final distribution of the residue on the field is directly related to the distribution of the residue particles in the cloud of residue particles 5. Therefore, when a side wind 6 influences the cloud of residue particles 5 (as is shown in FIG. 1), the distribution of the residue on the field will also be affected. In the present description, the first zone of the residue and the second zone of the residue are defined as a respective first and second part of the 3-dimensional space constituting the cloud of residue particles 5. This means that the sensor 7 is able to measure reflections from residue particles that fly through the air (in the cloud of residue particles). Since the sensor 7 is able to measure reflections from a first zone and a second zone, the distribution of the cloud of residue particles 5 can be determined. As a result, the distribution of the residue on the field is also known since the latter is directly related to the distribution of residue particles in the cloud 5. Therefore, based on the knowledge of the cloud 5, the distribution on the field is known.

Figure 2:
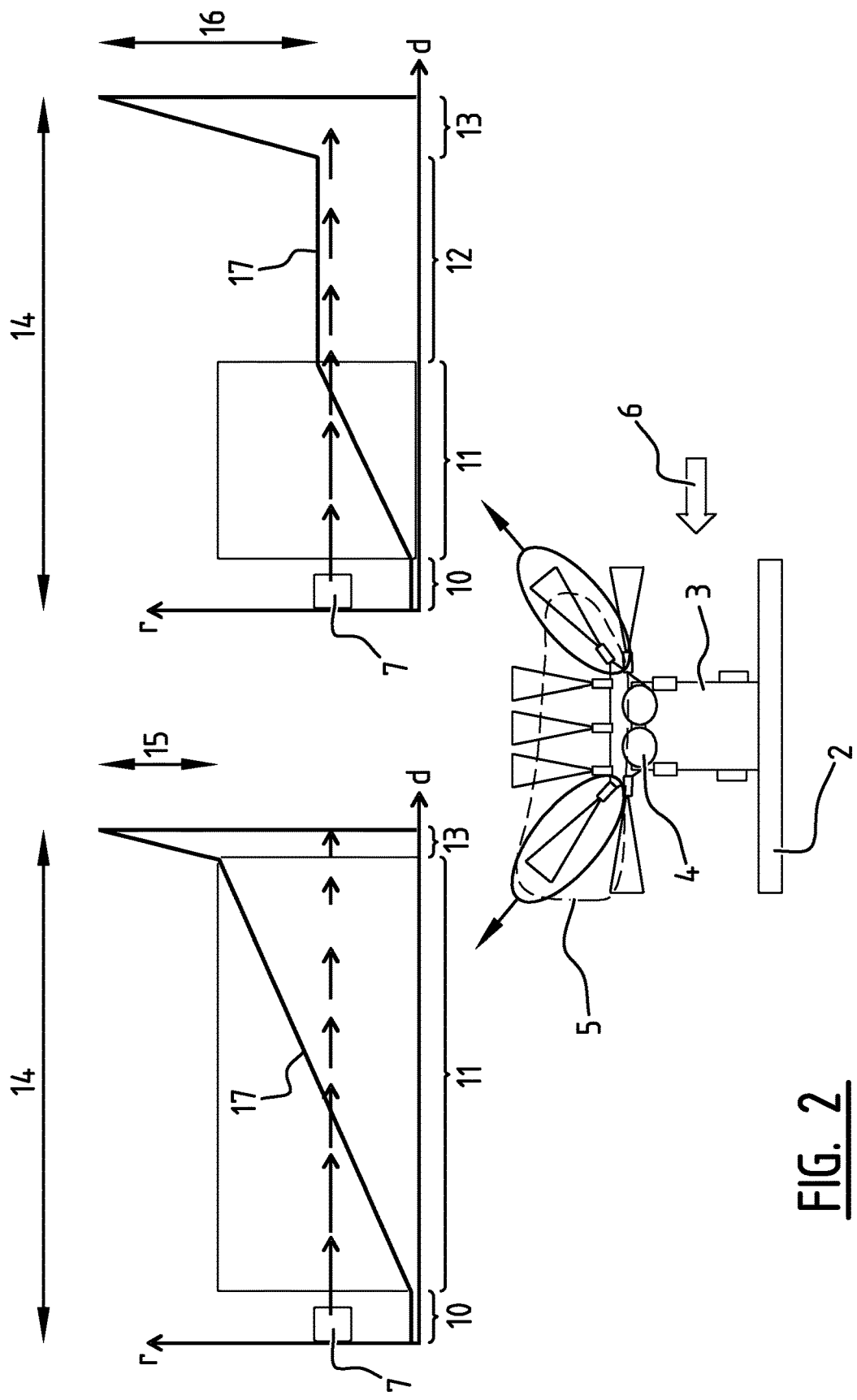
FIG. 2 illustrates the effect of the residue on the reflected signal.

FIG. 2 shows the effect on the sensor 7 measurement for an asymmetrical cloud of residue particles 5. Thereby symmetry is defined with respect to an upright plane that comprises the direction of travel of the combine and that crosses the center line of the combine 1. FIG. 2 shows a combine 1 with a header 2, combine body 3 and residue spreading system 4. Thereby a side wind 6 affects the distribution of the residue so that the cloud of residue particles is larger on the left hands side than on the right hand side of the figure. In the example of FIG. 2, the sensor 7 is directed towards the ground surface behind the agricultural combine (and behind the cloud of residue particles). FIG. 2 thereby shows 2 graphs, each corresponding to a reflection measurement from the first zone and the second zone. The graphs show on the horizontal axis the distance from the sensor 7 to the measured reflection, and on the vertical axis the accumulated intensity of the reflection.

The graph on the left hand side of the figure shows the sensor 7 and shows how, in a first segment 10 of the measured zone, no reflections are received. In the example of FIG. 2 this is the result of the sensor being mounted above the cloud of residue particles, so that the emitted wave signal has to travel from the sensor to the cloud of residue particles before receiving any reflections. Once the cloud of residue particles is reached, the sensor 7 starts to measure reflections of the emitted signal, this is shown in segment 11. Thereby the figure shows a theoretical situation wherein the density of the residue particles in the cloud of residue particles is constant. This constant density results in a gradual and constant reception of reflections of the emitted signal by the sensor 7. Once the emitted signal reaches the ground surface, a reflection peak is received, being indicated with segment 13 of the graph. The height 15 of the reflection peak is inversely proportional to the amount of residue particles in the cloud 5 (as will be further clarified with respect to the graph on the right hand side).

The graph on the right hand side shows a similar first segment 10 of the sensor measurements, and shows a second segment 11 that is significantly shorter than segment 11 on the graph at the left hand side. This is the result of the cloud of residue particles being smaller on the right hand side than on the left hand side (due to the side wind 6). As a result, the right hand side graph shows a third segment 12 wherein the sensor 7 receives no reflections. In this third segment 12, the wave signal travels out of the cloud of residue particles 5 until it reaches the ground surface. Again, when the ground surface is reached, a reflection peak 13 is received at the sensor. Since the emitted wave signal distortion is less on the right hand side compared to the left hand side graph, the ground surface peak 16 is significantly larger on the right hand side graph. This illustrates how the ground surface measurement is inversely proportional to the amount of residue particles in the cloud of residue particles 5. The distance 14 corresponds to the distance between the sensor and the ground surface.

It will be clear for the skilled person that the graphs that are shown in FIG. 2 are theoretical graphs, and that in practice the sensor 7 could receive some noise in the sections 10 and 12 so that the resulting line 17 will not be completely horizontal in those sections. Furthermore, the density of the material in the cloud of residue particles will in practice not be constant so that the increase of measured reflections in section 11 will not be as smoothly as is shown in the figure. However the principles that are shown in the FIG. 2, and the corresponding principles that are explained above, still apply and can be implemented by the skilled person.

FIG. 3 shows some different set-ups of the sensor 7 on an agricultural combine 1. Thereby, FIG. 3a shows an embodiment wherein one single sensor is positioned in a central location of the combine body 3 and in a direction towards a zone behind the agricultural combine. Thereby, the one sensor 7 of FIG. 3a is provided to measure reflections coming from a wide angle (being an angle larger than 150 degrees, preferably larger than 170 degrees). Thereby, the zones 8, 9 are both covered by the single sensor 7. In order to measure reflections from different directions, this one sensor 7 may comprise multiple emitters and/or multiple receivers. Alternatively or additionally, one or more emitters or receivers are displaced and/or rotated in order to measure reflections from all relevant directions.

Figure 3A:
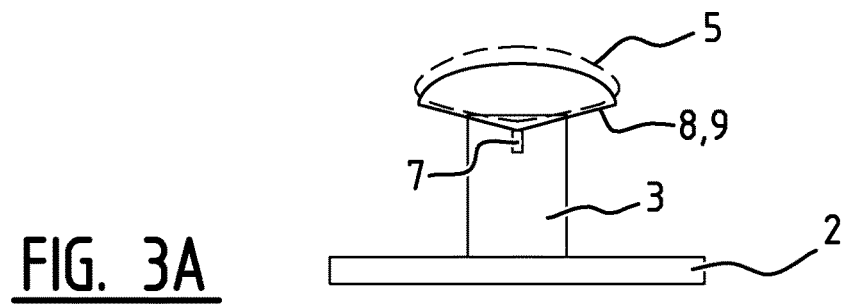
FIG. 3 shows multiple embodiments for sensor placement.
Figure 3B:
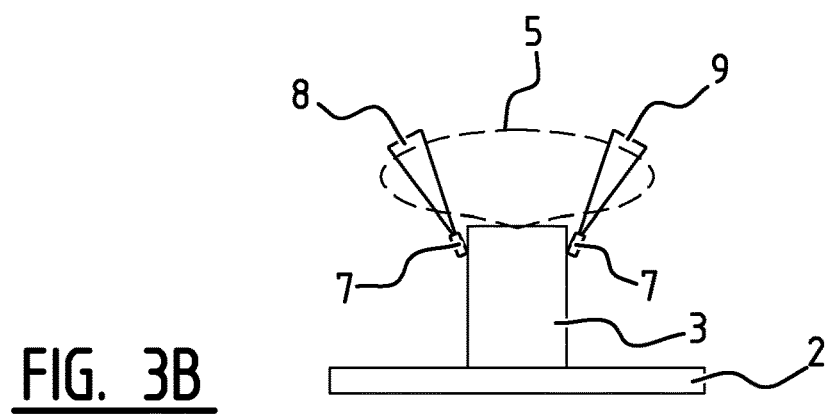

FIG. 3b shows a further embodiment wherein two sensors 7 are mounted at the location of opposite lateral sides of the body 3 of the agricultural combine. Thereby, each of the sensors 7 is directed towards a respective zone 7, 8, to measure reflections from the zone. An advantage of such position of the sensors 7 is that the sensors 7 are located relatively close to the zones of interest (being the first zone 8 and the second zone 9). This increases the intensity of the measured reflections, since the wave signals travel less far through the air. This configuration is therefore particularly suitable for sensors using ultrasonic/sound waves. These types of waves (longitudinal) are highly attenuated by the air medium. The attenuation in air becomes higher with a higher frequency (=shorter wavelength). So it's preferred to use a relatively high wavelength to reach a certain measuring range and to look through dust, but this is not unlimited, it's limited by the size of the straw particles (as will be explained in more detail hereunder. This attenuation phenomenon is not such a big issue when a sensor using transverse radar waves in the electromagnetic spectrum is used.

Figure 3C:
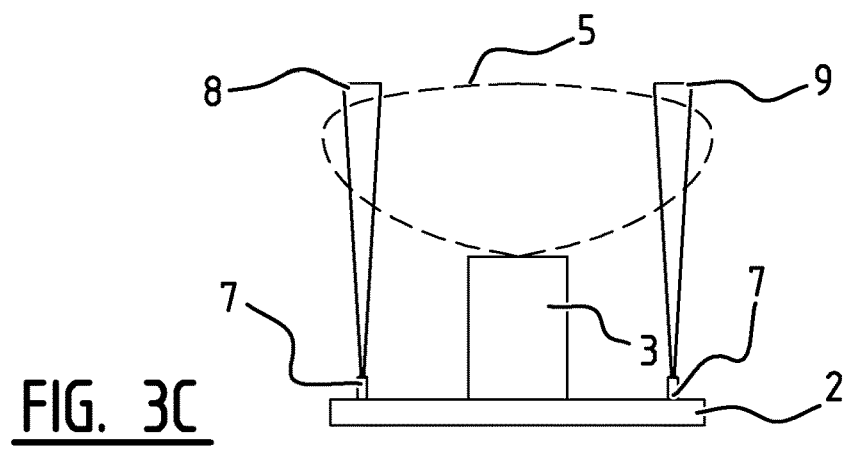

FIG. 3c illustrates a different embodiment wherein two sensors 7 are mounted at the location of opposite lateral ends of the header 2 of the agricultural combine. Thereby, the sensors 7 are directed towards the back of the combine to measure reflections from the respective zones 8, 9. An advantage of such a positioning of the sensors 7 is that sensors 7 can easily be positioned close to a ground surface. This allows the sensors 7 to be directed to measure reflections parallel to the ground surface. As a result, no reflection peak will be received at the sensor, and the measured reflections are directly proportional to the amount of residue particles in the cloud of residue particles 5. Furthermore, in such a set-up, the residue spreading system can easily be adjusted to distribute the residue over a width that corresponds to the width of the header.

Figure 3D:
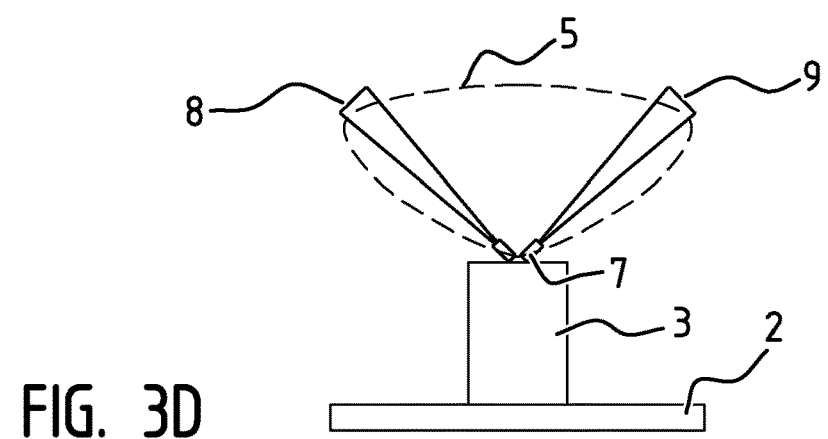

FIG. 3d shows a further embodiment wherein two sensors 7 are both mounted in a central location of the body 3 of the agricultural combine (similar to the sensor of FIG. 3a) and are directed towards a respective zone 8, 9 (similar to the sensors in the embodiment of FIG. 3b). With the set-up of FIG. 3d, the sensors 7 will measure reflections from throughout substantially the whole cloud of residue particles 5, so that this information can be used to steer the residue spreading system.

The sensor 7 can be a radar sensor or a sonar sensor. Radar sensors are used in many industries, and are known for their reliability in measuring reflections from an emitted wave signal. Radar sensors typically tend to measure reflections coming from a rather limited angular range (smaller than 50 degrees, preferably smaller than 30 degrees). Therefore, radar sensors are typically used in configurations or set-ups as shown in FIGS. 3b, 3c and FIG. 3d. Recent developments in sonar sensors have lead to 3D sonar sensors with a large angular range and capable of measuring reflections from multiple directions at the same time. Such sonar sensor is described in WO 2013/132038, which is referred to for the purpose of explaining the sonar sensor 7. Such sonar sensor can be used in any set-up including the set-up that is shown in FIG. 3a.

The sensor (radar sensor or sonar sensor) comprises an emitter for emitting a wave signal. In the case of a radar sensor, the emitted wave signal is an electromagnetic wave signal. In the case of a sonar sensor, the emitted wave signal is a sound wave signal. Radar sensors (making use of microwaves) are making use of transverse waves (kind of light) while sonar sensors are making use of longitudinal waves (sound waves). To penetrate dust and still detect straw particles, it is important to choose the correct wavelength. Thereby, following law is applicable: a wave is able to penetrate a certain medium only if half of the wavelength is bigger than the outer dimension of the particles in that medium. In the present case: 0.5*wavelength should be bigger than dust but smaller then outer dimension of straw. Thereby, the wave signal is preferably chosen to have a wavelength that is larger than an average dust particle. Furthermore, the wave signal is chosen to have a wavelength that is shorter than average outer dimensions of residue particles. This specific choice of wavelength of the emitted wave signal has a result that the wave signal will not reflect on dust particles while it will reflect on residue particles. This allows the sensor to operate in a cloud of dust (that is typically present behind an agricultural combine that is spreading residue particles onto the field). In practice, the wave length is preferably chosen to be larger than 0.001 mm, more preferably larger than 0.1 mm and most preferably larger than 1 mm. Furthermore, the wave length is preferably chosen smaller than 50 mm, more preferably smaller than 10 mm, most preferably smaller than 5 mm According to the example of the invention the wave length is chosen around 2 mm, when the sensor 7 emits a wave signal with a wavelength of around 2 mm, the wave signal will travel through the dust particles and the influence of the dust particles on the wave signal will be minimal. Furthermore, the wave signal will tend to reflect on every particle that has an outer dimension that is larger than 2 mm. Therefore, the wave signal will reflect on almost every residue particle that is in the cloud of residue particles. The sensor 7 will then measure the reflections of the wave signal. Based on the measured reflections, as is explained above and illustrated in FIG. 2, the distribution of the residue particles in the cloud of residue particles 5 can be determined. Consequently, the distribution of the residue onto the field is also known. Based on this knowledge, the residue spreading system is steered to counteract on any (internal and external) influences that affect the distribution of the residue on the field.

The above described embodiments and the shown figures are illustrative and serve only for a better understanding of the invention. The invention is not limited to the described embodiments. Different alternatives, and preferred features described in the text can be freely combined by a skilled person and developed in more detail to form an operational whole without departing from the claimed invention. The scope of protection of the invention will therefore be defined solely by the claims.

The invention claimed is:

1. A residue spreading system for an agricultural combine, that is steerable to influence distribution of residue when the residue spreading system is spreading the residue, the residue spreading system comprising:
   a sensor configured for emitting a wave signal through the residue, the sensor further configured for separately measuring reflections of the wave signal from the residue in a first zone and in a second zone, wherein said sensor is positioned such that a measuring direction of the sensor is substantially parallel to a ground surface, and wherein the reflections are directly proportional to a density of residue that is distributed,
   wherein the residue spreading system is steerable based on the measured reflections,
   wherein the wave signal has a wavelength that is larger than 0.001 mm and that is smaller than 50 mm,
   wherein the sensor is positioned such that the measuring direction of the sensor crosses the ground surface, and
   wherein the reflections comprise a first part being directly proportional to an amount of residue in a respective one of the first and second zones and a second part corresponding to a reflection of the wave signal on the ground surface and being inversely proportional to the amount of residue in the respective one of the first and second zones.

2. The residue spreading system according to claim 1, wherein the wave signal has a wavelength that is larger than 0.1 mm.

3. The residue spreading system according to claim 1, wherein the wave signal has a wavelength that is smaller than 10 mm.

4. The residue spreading system according to claim 1, wherein the sensor is a radar sensor.

5. The residue spreading system according to claim 1, wherein the sensor is a sonar sensor.

6. The residue spreading system according to claim 1, wherein the sensor comprises at least two receivers each being adapted for receiving reflections from a respective one of the first zone and the second zone.

7. The residue spreading system according to claim 6, wherein the sensor further comprises at least two emitters adapted for emitting respective wave signals through the first zone and the second zone, wherein the two emitters correspond to the two receivers.

8. The residue spreading system according to claim 1, wherein the sensor comprises only a single emitter adapted for emitting the wave signal through the first zone and the second zone.

9. The residue spreading system according to claim 1, further comprising a processor connected to the sensor to receive an input signal representing the measured reflections, and connected to the residue spreading system to steer the residue spreading system via an output signal.

10. An agricultural combine comprising the residue spreading system according to claim 1.

11. A method for steering a residue spreading system of an agricultural combine, the method comprising steps of:
    emitting a wave signal having a wavelength that is larger than 0.001 mm and that is smaller than 50 mm through residue when the residue spreading system is spreading the residue;
    measuring reflections of the signal in at least a first direction and a second direction, wherein said first and second directions are substantially parallel to a ground surface, and wherein the reflections comprise a first part being directly proportional to an amount of residue in a respective one of first and second zones and a second part corresponding to a reflection of the wave signal on the ground surface and being inversely proportional to the amount of residue in the respective one of the first and second zones; and
    steering the residue spreading system based on the measured reflections to influence distribution of the residue spreading system.

12. A residue spreading system for an agricultural combine, that is steerable to influence distribution of residue when the residue spreading system is spreading the residue, the residue spreading system comprising:
    a sensor configured for emitting a wave signal through the residue, the sensor further configured for separately measuring reflections of the wave signal from the residue in a first zone and in a second zone,
    wherein the residue spreading system is steerable based on the measured reflections, and
    wherein the sensor is positioned such that a measuring direction of the sensor is substantially parallel to a ground surface, and wherein the reflections are directly proportional to a density of residue that is distributed and wherein the sensor is positioned such that the measuring direction of the sensor crosses the ground surface, and wherein the reflections comprise a first part being directly proportional to an amount of residue in a respective one of the first and second zones and a second part corresponding to a reflection of the wave signal on the ground surface and being inversely proportional to the amount of residue in the respective one of the first and second zones.

* * * * *